United States Patent
Emeott et al.

(10) Patent No.: US 7,236,477 B2
(45) Date of Patent: Jun. 26, 2007

(54) METHOD FOR PERFORMING AUTHENTICATED HANDOVER IN A WIRELESS LOCAL AREA NETWORK

(75) Inventors: Stephen P. Emeott, Rolling Meadows, IL (US); Anthony J. Braskich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 148 days.

(21) Appl. No.: 11/246,357

(22) Filed: Oct. 7, 2005

(65) Prior Publication Data

US 2006/0083200 A1    Apr. 20, 2006

Related U.S. Application Data

(60) Provisional application No. 60/619,372, filed on Oct. 15, 2004.

(51) Int. Cl.
*H04Q 7/20* (2006.01)
*H04Q 7/38* (2006.01)

(52) U.S. Cl. ............... 370/331; 370/328; 370/338; 370/332; 370/333; 370/334; 370/310; 455/436; 455/410; 455/411; 455/437; 455/438; 455/422.1; 455/426.1; 380/247; 380/277; 380/278; 380/281; 380/283; 380/249; 380/250

(58) Field of Classification Search ............... 370/331, 370/328, 338, 332, 333, 334, 310; 455/436, 455/437, 438, 439, 440, 441, 442, 443, 444, 455/445, 422.1, 403, 426.1, 426.2, 500, 517, 455/410, 411; 380/247, 277, 278, 281, 283, 380/44, 282, 30, 249, 250

See application file for complete search history.

(56) References Cited

U.S. PATENT DOCUMENTS

| 6,587,680 | B1 * | 7/2003 | Ala-Laurila et al. | ........ 455/411 |
| 2004/0077335 | A1 * | 4/2004 | Lee et al. | .................. 455/410 |
| 2007/0064647 | A1 * | 3/2007 | Prasad | ....................... 370/331 |

OTHER PUBLICATIONS

Establishing PTK liveness during re-association—Nancy Cam-Winget, Cisco Systems, Inc. Emily H. Qi and Jesse Walker, Intel Corporation—doc.: IEEE 802.11-04/0707r0—Printout of Slides 1 through 17—Jul. 2003.

Topics in Wireless Security—Proactive Key Distribution Using Neighbor Graphs—Arunesh Mishra, Min Ho Shin, Nick L. Petroni, Jr., T. Charles Clancy, and William A. Arbaugh, University of Maryland—IEEE Wireless Communications—pp. 26 through 36—Feb. 204.

* cited by examiner

*Primary Examiner*—Keith Ferguson
(74) *Attorney, Agent, or Firm*—Scott M. Garrett

(57) ABSTRACT

A wireless local area network system (100) supporting mobile radio telephony reduces the time to complete an authenticated handover from one access point (104) to another (108) by a mobile station (102) by performing some of the steps normally performed upon leaving one access point while still associated with that access point. More particularly, the mobile station causes a cryptographic key (204) to be preestablished (212) for use when handing over to a new access point. The cryptographic key is derived at the mobile station, and is also derived in the WLAN infrastructure and stored until the mobile station initiates a handover.

22 Claims, 5 Drawing Sheets

METHOD FOR PERFORMING AUTHENTICATED HANDOVER IN A WIRELESS LOCAL AREA NETWORK

CROSS-REFERENCED APPLICATION

This Application is based on and claims priority from Provisional Application Ser. No. 60/619,372, filed Oct. 15, 2004.

TECHNICAL FIELD

This invention relates in general to handoff in wireless local area networks, and in particular authenticated handoffs from a first access point to a second access point in an efficient manner so as to reduce handoff time.

BACKGROUND OF THE INVENTION

Wireless local area networks (WLANs) are becoming popular communications systems, in addition to being convenient data networking systems. Specifically, manufacturers are working to develop WLANs as telephony systems as an alternate to wide area cellular systems under certain circumstances, such as business and other enterprise organizations. Providing telephony service over WLANs allows a relatively inexpensive alternative to traditional wireless cellular communication. An organization can set up a WLAN, allowing authorized communication devices to access telephony service over the WLAN.

As with cellular telephony and mobile communication systems, users of WLAN telephony services will be mobile, and as they move through an area served by a WLAN system, their WLAN mobile station will occasionally have to handoff service from one access point to another. To prevent unauthorized access to telephony services, WLAN standards such as IEEE 802.11i provide security for authenticated handovers. A method specified in IEEE 802.11i uses a 4-way handshake process. When a mobile station needs to handover from a presently associated access point to a neighboring access point, the mobile station first transmits a reassociation request to the neighbor access point, including a pairwise master key identifier (PMKID). The neighbor or target access point transmits a reassociation response, which is followed by an acknowledgement by the mobile station. The target access point then transmits the first handshake message including a pseudorandom value known as an ANonce. The mobile station then responds by transmitting a pseudorandom value it has generated known as the SNonce, as well as a message integrity code, and other security related information. Two additional exchanged take place until the target point and the mobile station are both in possession of a common session key, each having generated the session key. Once the session key is acquired by both the mobile station and the target access point, the session key is installed at each station and secure communication commences using the session key for security. This process typically takes 800-1000 milliseconds in the case where the neighbor access point and the mobile station must acquire the PMK from an authentication server prior to executing the 4-way handshake. It is desirable to reduce the time it takes to handover, therefore there is a need to reduce the handover time, while still providing security comparable to that provided by present systems.

DETAILED DESCRIPTION OF A PREFERRED EMBODIMENT

Figure 1:
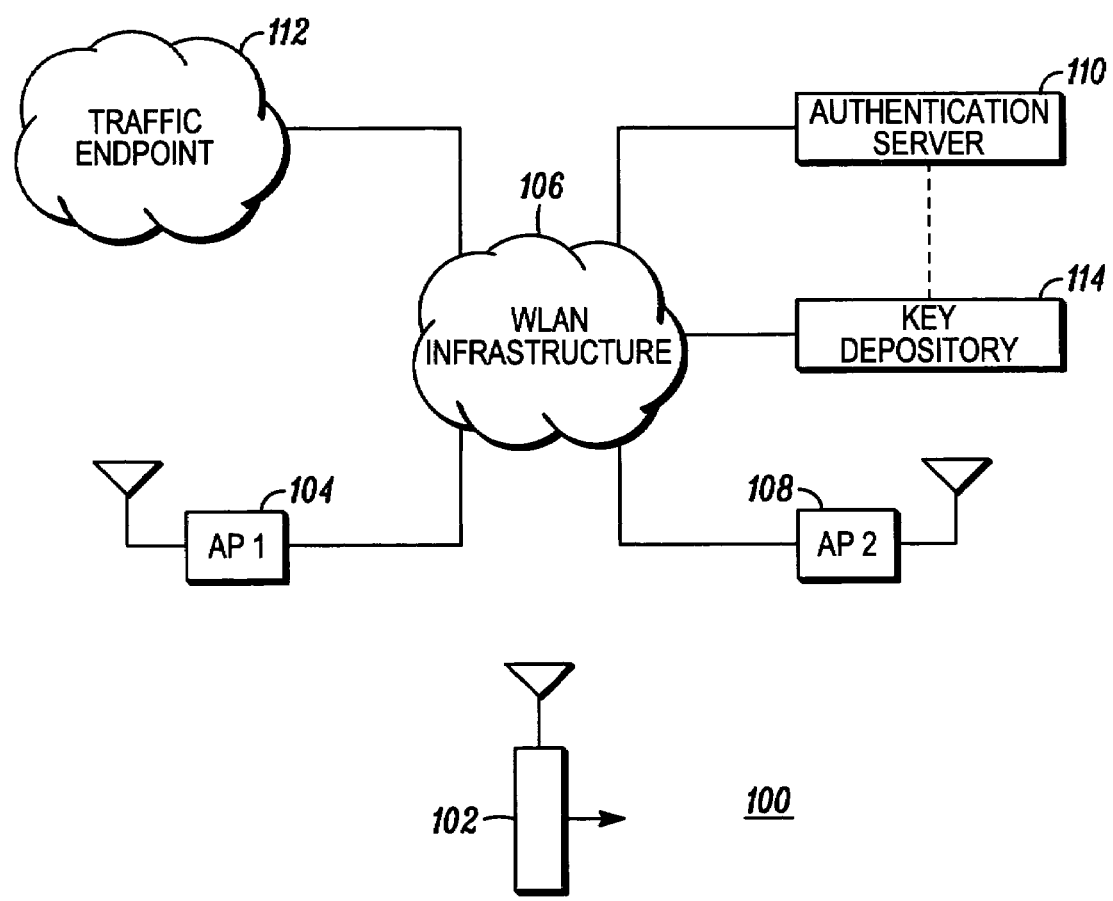
FIG. 1 shows a schematic block diagram of a WLAN system, in accordance with one embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention reduces the time to complete an authenticated handover from one access point to another by a mobile station by performing some of the steps normally performed upon leaving one access point while still associated with that access point. More particularly, the mobile station causes a cryptographic key to be preestablished for use when handing over to a new access point. The cryptographic key is derived at the mobile station, and is also derived in the WLAN infrastructure and stored until the mobile station initiates a handover.

Referring now to FIG. 1, there is shown a schematic block diagram of a WLAN system 100, in accordance with one embodiment of the invention. A mobile station 102, such as a portable WLAN-enabled telephone is initially associated with a first access point 104. By associated it is mean that the access point is providing communication service to the mobile station, and may have reserved communication resources to ensure a desired quality to service (QoS) for certain communication modes, such as, for example, real time voice traffic associated with a live telephone conversation. The access point is operably coupled to a WLAN infrastructure 106 which includes routers and switches, as is known in the art, for transporting data among the various network entities and to other networks 112. Other access points such as a second access point 108 may also be operably coupled to the WLAN infrastructure, particularly when the second access point is a neighboring access point of the first access point 104. To provide authentication services, an authentication server 110 is coupled to the WLAN infrastructure so that mobile stations, access points and other network entities can participate in authentication activities to protect against unauthorized access to the network. The system may also employ a network entity such as a key depository 114 for maintaining and distributing cryptographic keys, or simply keys, for use in authentication service. Alternatively, keys may be distributed to exiting network entities.

The mobile station may be initially associated with the first access point 104, meaning that the mobile station is receiving network services from the access point, and connecting to other network entities through the access point. The access point enforces a security policy, and requires mobile stations to be authenticated prior to providing service and access to the mobile stations. The mobile station and access point also derive a common cryptographic key to be used during communication to resist attempts by third parties to listen to the communication between the mobile station and access point. As the mobile station moves in the area served by the WLAN, the mobile station may move out of the area served by the first access point and into the area of neighboring second access point 108. To reassociate with the second access point, the mobile station 102 must again be authenticated. While still associated with the first access point, and preferably shortly after becoming associated with the first access point, the mobile station sets up cryptographic key to be used for the authentication process when performing a handover to a neighboring access point.

Figure 2:
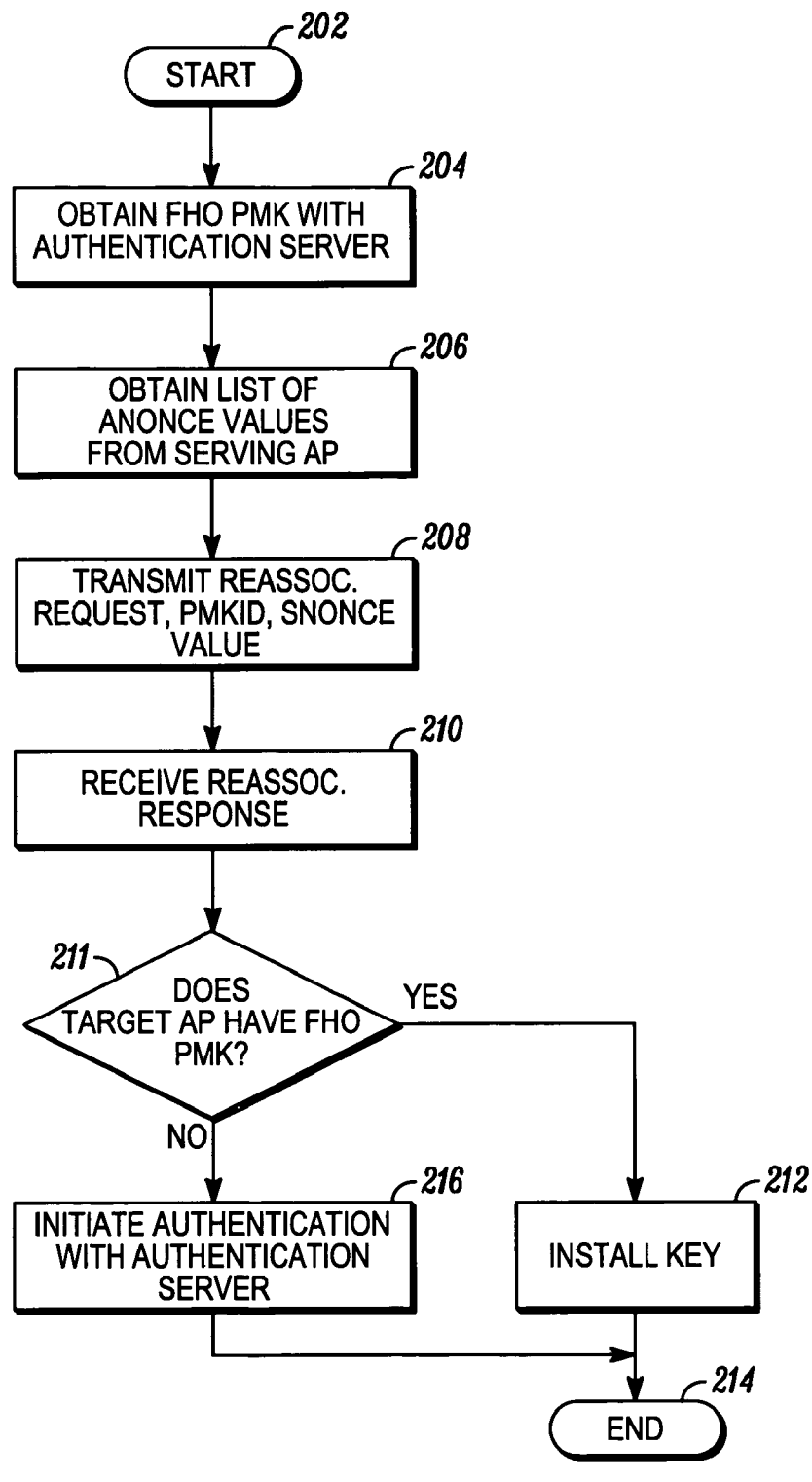
FIG. 2 shows a flow chart diagram of a method for fast handover of a mobile station from a first access point to a second access point, in accordance with an embodiment of the invention.

Referring now to FIG. 2, there is shown a flow chart diagram 200 of a method for fast handover of a mobile station from a first access point to a second access point, in accordance with an embodiment of the invention. At the start 202 of the method, the mobile station is associated with the first access point, meaning it has already been authenticated, either by a prior art authentication method or by a present method of the invention. While associated with the first access point, the mobile station contacts the authentication server, requesting key or cryptographic key material (204). It is contemplated that the master key may be kept secret, and so only key material is for generating other keys is sent to requesting entities. The authentication process may be performed in accordance with IEEE specification 802.1X, for example. The result of the authentication is the establishment of a cryptographic key known as a pairwise master key (PMK). The mobile station receives the key material over the WLAN, and using a predetermined algorithm, derives the PMKkey material. Similarly, the authentication server may also derive the PMK using the same algorithm and input information as used by the mobile station. The PMK is then pushed to a key depository. The key depository may be, for example, a stand alone WLAN network entity, or it may simply be the access point to which the mobile station is presently associated. Other network entities may similarly serve as the key depository. Alternatively the PMK may be derived by the key depository.

Once the PMK has been derived at the mobile station and a handover target, the mobile station derives PMK identifier, which may be, for example, a cryptographic hash of the PMK that is much shorter than the PMK. The PMK identifier may also be derived at a target access point. In conjunction with the process of setting up a new PMK for fast handover, the first access point, to which the mobile station is presently associated, generates a list of cryptographic values, such as, for example, ANonce values, which as pseudorandom numbers (206). These numbers are used in the process of generating a temporary session key, as will be described herein. The list of ANonce values includes one pseudorandom number for each of the access point's neighbor access points, and the ANonce values are each related to a particular neighbor access point. Once the PMK and ANonce list has been acquired by the mobile station (206), the mobile station is ready to perform a fast handover in accordance with the invention. The first access point also sends a message to each of its neighbor access points informing them of the ANonce value it has generated for it, and includes the mobile station identifier to correlate the mobile station with the particular ANonce value.

Some time after the mobile station has acquired the ANonce list and the PMK, a condition occurs where the mobile station decides to handover to a second access point, which is a neighbor of the first access point. To initiate the handover, the mobile station transmits a reassociation request message to the second access point (208). The reassociation request message includes the PMK identifier and a station cryptographic value, or SNonce. The SNonce is, like the ANonce, a pseudorandom number generated by the mobile station. Both the ANonce and SNonce are used in generating a temporary session key to be used to encrypt data communicated between the mobile station and second access point upon successfully associating with the second access point. In the messaging from the mobile station, the mobile station's network identifier is transmitted to the second access point. The mobile station's identifier may be used to find the ANonce generated by the first access point correlating to the mobile station. Since the mobile station had an ANonce list prior to attempting reassociation, both the mobile station and the second access point each have the necessary SNonce and ANonce required for deriving the temporary session key, known as the pairwise temporary key (PTK). Once the second access point received the reassociation request, including the PMK identifier, it acquires the PMK. Acquiring the PMK may be accomplished by any one of several ways. For example, the second access point may prompt the key depository for the PMK. As mentioned herein, the key depository may be any one of several network entities, including a stand-alone network entity. Alternatively the key depository may have already pushed a copy of the PMK to all the neighbor access points of the first access point, so the second access point may have a cached copy of the PMK and it simply needs to locate it in its cache. In another alternative, the mobile station may ask the key depository to push the PMK to a particular access point, in which case, if the key depository is also the first access point, the mobile station may also request the first access point to forward admissions control and quality of service information to the second access point. Following the reassociation request, the second access point transmits a reassociation response (210), and indicate whether the second access point has acquired the PMK. The mobile station checks the reassociation response to determine whether the second access point has acquired the PMK (211), and assuming it has, both the mobile station and second access point may then derive the PTK and install the PTK for use in encrypting communications between the mobile station and the second access point (212). Optionally, in the reassociation request, the mobile station may indicate whether it will ask for a PTK integrity check. If so, then the integrity check may occur before installation of the PTK. The integrity check may be performed by, for example, computing a one-way hash of the PTK and transmitting it to the second access point, which will likes compute the one-way hash and compare, informing the mobile station as to the results of the comparison. Once the PTK is installed, the handover is complete (214). If the second access point was unable to acquire the PMK, then the mobile station initiates an alternative authentication process, such as a prior art authentication process.

Figure 3:
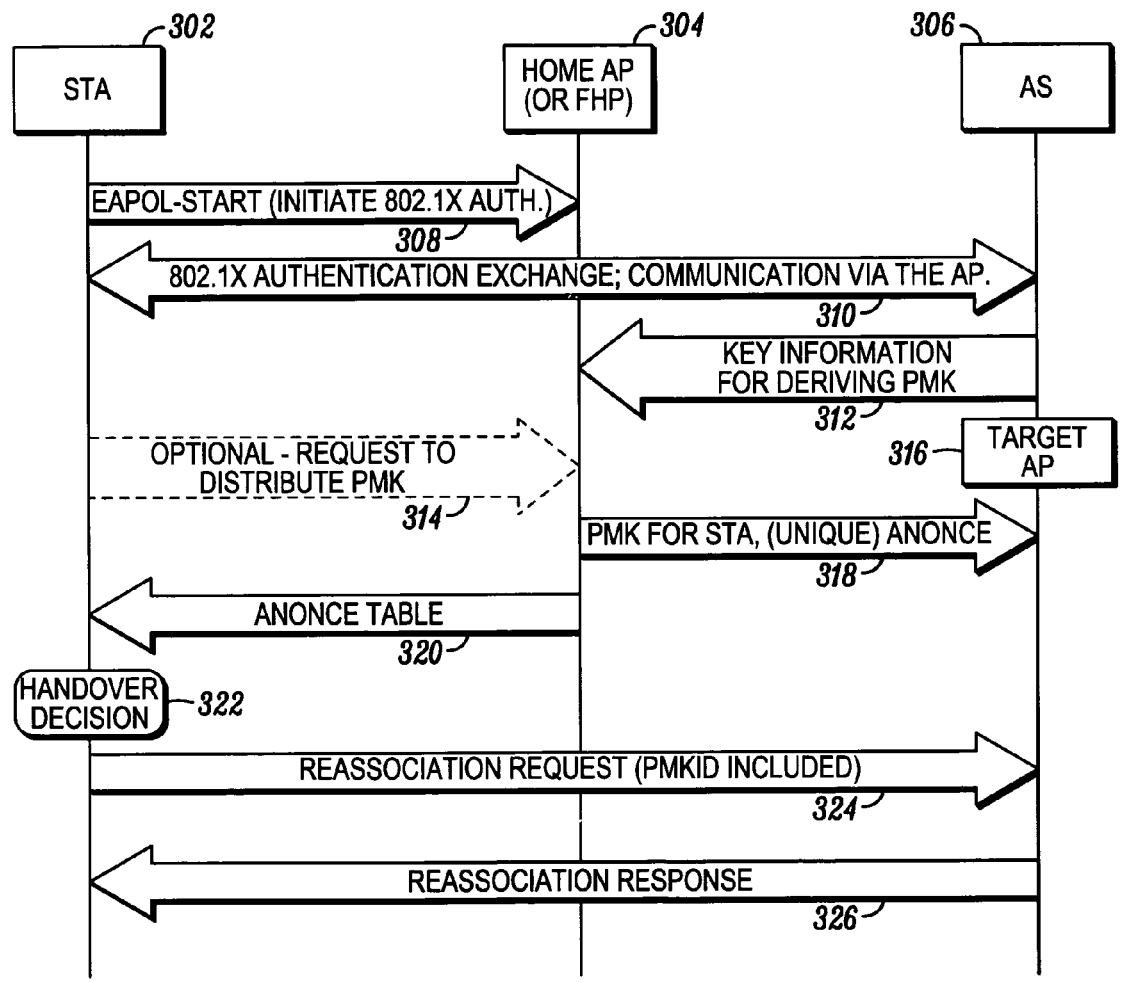
FIG. 3 shows a signal flow diagram of a method of performing an authenticated handover, in accordance with an embodiment of the invention.

Referring now to FIG. 3, there is shown a signal flow diagram 300 of a method of performing an authenticated handover, in accordance with an embodiment of the invention. There are four network entities shown here; the mobile station 302, the first or home access point 304, the authentication server 306, and the target or second access point 316. As shown here, the first access point 304 is acting as the key depository. If the key depository is not the first access point, the an additional entity would be added to the chart shown here. After the mobile station is successfully associated with the first access point, the mobile station prepares for a future handover by initiating the generation of PMK. That process starts with an authentication request 308, which may be performed with an extensible authentication protocol over LAN start message 308, as defined by IEEE specification 802.1X, being transmitted to the first access point. Subsequently the mobile station and the authentication server compete a preauthentication request 310, resulting in the generation of PMK. The authentication server forwards the PMK to the first access point, or key depository if different than the first access point 312. Upon request from the mobile station, or alternatively as a matter of course, the first access point generates the ANonce list and distributes the ANonce information and PMK to neighbor access points 314, 318. The ANonce list is also transmitted to the mobile station 320. Upon deciding to handover to the second access point 322, the mobile station first transmits a reassociation request 324 including the SNonce and PMK identifier. The reassociation request is followed by a reassociation response message 326, indicating whether or not the second access point has acquired the PMK.

Figure 4:
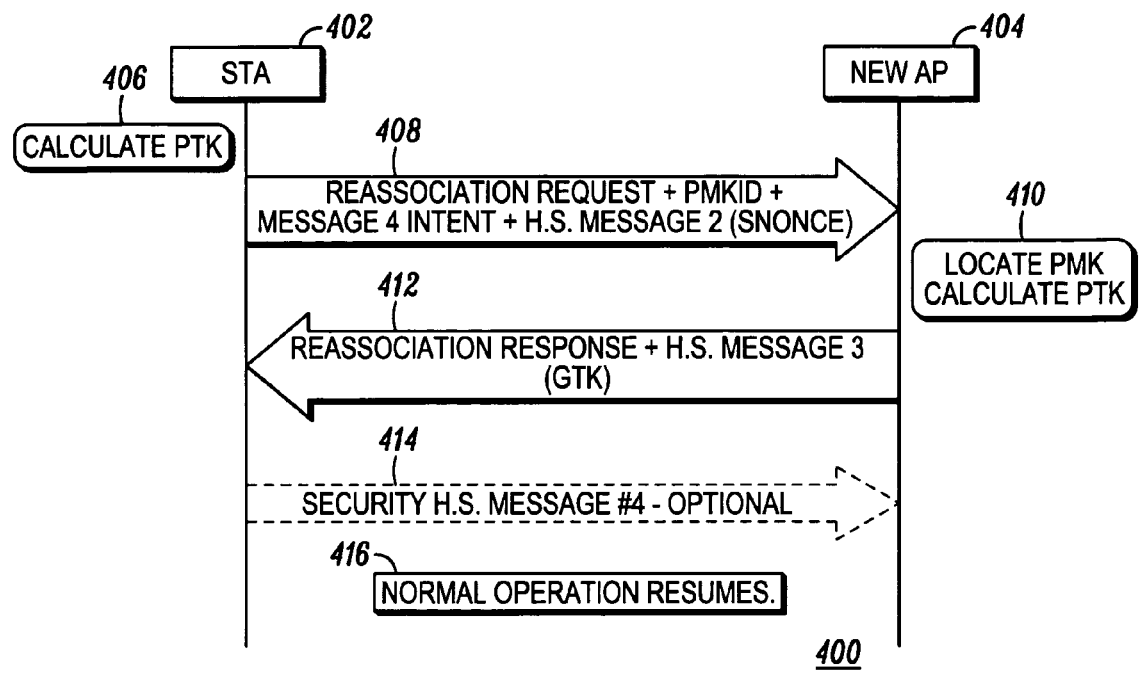
FIG. 4 shows a detailed signal flow chart diagram of the interaction between a mobile station and an access point once the decision is made to handover to the second access point, in accordance with an embodiment of the invention.

FIG. 4 shows a detailed signal flow chart diagram 400 of the interaction between the mobile station 402 and the second access point 404 once the decision is made to handover to the second access point. Prior to the start of the process illustrated in FIG. 4, the PMK has been generated and stored at a key depository or acting key depository, and the mobile station has received the key material from the authentication server. First the mobile station generates the PTK 406. The process starts with the reassociation request message 408, including the PMK identifier, SNonce, and optionally a request to perform an acknowledgement of the PTK being installed at the mobile station. The transmission of the SNonce is performed in the prior art in what is known as a hand shake message 2. Similarly the key install check is performed as the fourth part, or message 4, of the same prior art authentication procedure. The present invention allows all 4 steps of the prior art to be performed, thus permitting the same degree of authentication and security, but rearranges how and when the step are performed so as to significantly reduce the time it takes to perform an authenticated handover.

Once the second access point receives the reassociation request, it locates or acquires the PTK and calculates or generates the PTK 410. The second access point then transmits a reassociation response message which may include a group temporal key (GTK), which is a random value assigned by the access point used to protect data, as is known. Compared to the prior art, the reassociation response performs the function of the third handshake message of the prior art method of authentication. If the mobile station requested it, and integrity check message 414 may be transmitted. Upon completion of installing the PTK, the handover is complete and normal operation may then resume. If the former serving access point had forwarded admissions information, the second access point, now the present serving access point, may have reserved resources accordingly.

Figure 5:
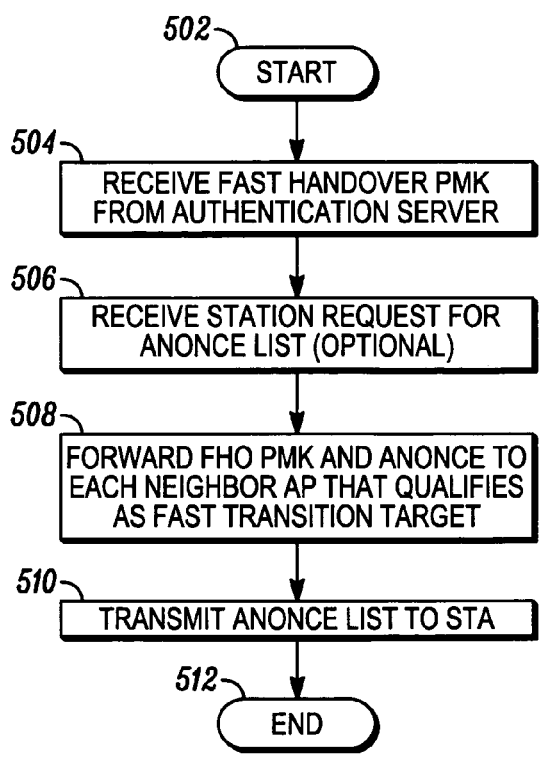
FIG. 5 shows a flow chart diagram of a method for authenticated handover in a WLAN system, in accordance with an embodiment of the invention.

Referring now to FIG. 5, there is shown a flow chart diagram 500 of a method for authenticated handover in a WLAN system, in accordance with an embodiment of the invention. The process illustrated here is the perspective of the first access point, and at the start (502) of the process, the mobile station is associated with the first access point and has requested preauthentication set up for a fast handover, in accordance with an embodiment of the invention. In response, the authentication server transmits cryptographic key information to the first access point, which, in the present example, is acting as the key depository (504). The first access point may generate the PMK from the information transmitted to it form the authentication server, or the authentication server may, alternatively, generate and transmit the PMK to the first access point or acting key depository. In one embodiment of the invention, the mobile station requests that the serving access point generates an ANonce list (506). Alternatively the access point may do so automatically. Subsequently, the access point transmits the PMK and specific ANonce value to each neighbor access point (508). In addition, the access point transmits the ANonce list to the mobile station (510) so that is will know which ANonce to use, depending on which neighbor access point it eventually hands over to, and the process terminates (510).

Figure 6:
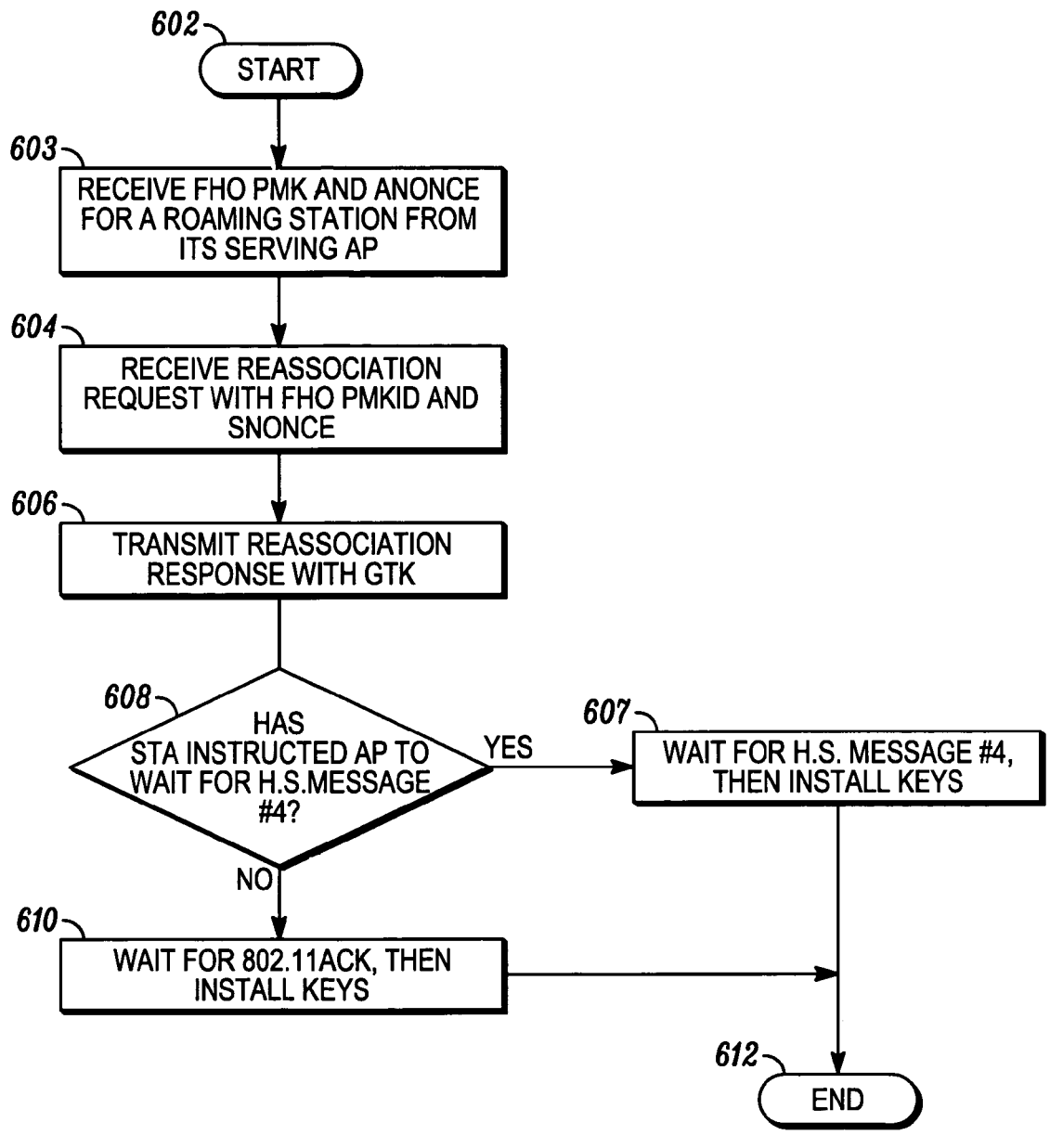
FIG. 6 shows a flow chart diagram of a method for performing fast handover in a WLAN, in accordance with an embodiment of the invention.

Referring now to FIG. 6, there is shown a flow chart diagram 600 of a method for performing fast handover in a WLAN, in accordance with an embodiment of the invention. The process illustrated in FIG. 6 is from the perspective of the second access point to which the mobile station eventually hands over to from the first access point. A the start (602) the second access point is completely unaware of he mobile station and has no information about it. At some point the second access point receives a copy of the PMK and an ANonce value from the first access point (603). The ANonce value will be keyed to, for example the mobile stations network identifier, so that when it receives a first transmission form the mobile station it can cross reference the received network identifier with the correct ANonce value. Subsequently the second access point receives a reassociation request form the mobile station, including the PMK identifier and an SNonce value (604). The PMK identifier allows the second access point to retrieve the corresponding PMK, either from its local cache, or from a key depository, and the SNonce, together with the ANonce received from the first access point, allow the second access point to generate the PTK. Once the PTK has been located and the PTK calculated, the second access point transmits the reassociation response message (606). If the mobile station has requested an integrity check, the second access point waits for the integrity check message from the mobile station and then installs the PTK (607). If no integrity check was requested, the second access point simply waits for a standard acknowledgement message and then commences with PTK installation (610). Once the PTK is installed, the method is finished and the handover is complete, authenticated, and secure. The method then terminates, and the second access point may then broadcast a message to other network entities that the mobile station is now associated with it so that data destined for the mobile station is routed to the second access point.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for performing authenticated handover in a wireless local area network (WLAN) by a mobile station, comprising:
   while associated with a first access point:
      obtaining a fast handoff master key from an authentication server associated with the WLAN;
      calculating a pairwise master key and a pairwise master key identifier from the master key;
      obtaining a list of ANonce values and neighbor access point identifiers from the first access point, where each ANonce value is unique and associated with one neighbor access point;
   deciding to handover to a second access point, the second access point being a neighbor access point of the first access point;
   upon deciding to handover to the second access point, transmitting a reassociation request to the second access point, the reassociation request including the pairwise master key identifier and an SNonce value;
   receiving from the second access point a reassociation response including an indication that the second access point has acquired the pairwise master key;
   calculating a pairwise temporary key based on the pairwise master key, SNonce value, and ANonce value associated with the second access point on the list of ANonce values obtained from the first access point;
   installing the pairwise temporary key; and
   commencing service with the second access point using the pairwise temporary key.

2. A method for performing authenticated handover as defined in claim 1, further comprising performing an integrity check of the pairwise temporary key with the second access point, performed before installing the pairwise temporary key.

3. A method of performing authenticated handover from a first access point to a second access point by a mobile station in a wireless local area network, the second access point being a neighbor access point of the first access point, the method comprising:
   preauthenticating a first cryptographic key with an authentication server in the WLAN;
   receiving a list of neighbor access points and associated access point cryptographic values from the first access point;
   deriving a second cryptographic key from the first cryptographic key according to a predefined computation;
   deriving a second cryptographic key identifier from the second cryptographic key;
   deciding to reassociate with the second access point;
   transmitting a reassociation request to the second access point, including a key identifier associated with the master key and a station cryptographic value;
   receiving a reassociation response from the second access point including an indication that the second access point has acquired the second cryptographic key;
   deriving a session cryptographic key from the second cryptographic key, station cryptographic value, and access point cryptographic value associated with the second access point on the list of neighbor access points acquired from the first access point; and
   installing the session cryptographic key for use while communicating with the second access point.

4. A method for performing authenticated handover in a wireless local area network (WLAN) by a mobile station from a first access point to a second access point, the second access point being a neighbor access point of the first access point, the method comprising:
   while the mobile station is associated with the first access point:
      generating a first cryptographic key at an authentication server in the WLAN in response to an authentication request by the mobile station;
      distributing the first cryptographic key to the mobile station and an acting key depository coupled to the WLAN;
      calculating a second cryptographic key based on the first cryptographic key at the mobile station and acting key depository;
   receiving a reassociation request at the second access point including a second cryptographic key identifier;
   acquiring the second cryptographic key from the key depository;
   transmitting a confirmation to the mobile station indicating the second access point is in possession of the second cryptographic key;
   deriving a session key at the mobile station and the second access point based on the second cryptographic key;
   installing the session key at the mobile station and the second access point; and
   commencing service between the second access point and the mobile station using the session key for secure communication.

5. The method of performing authenticated handover as defined in claim 4, wherein the acting key depository is the first access point.

6. The method of performing authenticated handover as defined in claim 4, wherein the acting key depository is a stand alone network entity.

7. The method of performing authenticated handover as defined in claim 4, further comprising:
   generating a list of access point cryptographic values at the first access point, wherein one access point cryptographic value is generated for each neighbor access point of the first access point, and where each one of the access point cryptographic values is associated with one neighbor access point; and
   transmitting the list of access point cryptographic values and associated access point identifiers to the mobile station.

8. The method of performing authenticated handover as defined in claim 4, wherein receiving the reassociation request includes a station cryptographic value, the session key is generated using the station cryptographic value.

9. The method of performing authenticated handover as defined in claim 4, wherein transmitting the confirmation is performed in response to the second access point having the second cryptographic key cached at the second access point.

10. A method for performing authenticated handover in a wireless local area network (WLAN) by a mobile station, comprising:
    while associated with a first access point:
       obtaining key material from an authentication server associated with the WLAN;
       calculating a pairwise master key from the key material;
       obtaining a list of ANonce values and neighbor access point identifiers from the first access point, where each ANonce value is unique and associated with one neighbor access point;
    deciding to handover to a second access point, the second access point being a neighbor access point of the first access point;

upon deciding to handover to the second access point, transmitting a reassociation request to the second access point, the reassociation request including a pairwise master key identifier calculated from the pairwise master key and an SNonce value;

receiving from the second access point a reassociation response including an indication that the second access point has acquired the pairwise master key;

calculating a pairwise temporary key based on the pairwise master key, SNonce value, and ANonce value associated with the second access point on the list of ANonce values obtained from the first access point;

installing the pairwise temporary key; and commencing service with the second access point using the pairwise temporary key.

11. A method for performing authenticated handover as defined in claim 10, further comprising performing an integrity check of the pairwise temporary key with the second access point, performed before installing the pairwise temporary key.

12. A method of performing authenticated handover from a first access point to a second access point by a mobile station in a wireless local area network, the second access point being a neighbor access point of the first access point, the method comprising:

obtaining a cryptographic key receiving a list of neighbor access points and associated access point cryptographic values from the first access point;

deciding to reassociate with the second access point;

deriving a cryptographic key identifier from the cryptographic key;

transmitting a reassociation request to the second access point, including a key identifier associated with the cryptographic key and a station cryptographic value;

receiving a reassociation response from the second access point including an indication that the second access point has acquired the cryptographic key;

deriving a session cryptographic key from the cryptographic key, station cryptographic value, and access point cryptographic value associated with the second access point on the list of neighbor access points acquired from the first access point; and installing the session cryptographic key for use while communicating with the second access point.

13. The method of performing authenticated handover defined in claim 12 wherein obtaining the cryptographic key involves preauthenticating with an authentication server in the WLAN.

14. The method of performing authenticated handover defined in claim 13 wherein obtaining the cryptographic key involves retrieving the cryptographic key from a cache of stored cryptographic keys.

15. A method for performing authenticated handover in a wireless local area network (WLAN) by a mobile station from a first access point to a second access point, the second access point being a neighbor access point of the first access point, the method comprising:

while the mobile station is associated with the first access point:

generating a cryptographic key at an authentication server in the WLAN in response to an authentication request by the mobile station;

distributing the cryptographic key to an acting key depository coupled to the WLAN;

receiving a reassociation request at the second access point including a cryptographic key identifier;

acquiring the cryptographic key from the key depository;

transmitting a confirmation to the mobile station indicating the second access point is in possession of the cryptographic key;

deriving a session key at the mobile station and the second access point based on the second cryptographic key;

installing the session key at the mobile station and the second access point; and commencing service between the second access point and the mobile station using the session key for secure communication.

16. The method of performing authenticated handover as defined in claim 15, wherein the acting key depository is the first access point.

17. The method of performing authenticated handover as defined in claim 16, wherein the acting key depository is a stand alone network entity.

18. The method of performing authenticated handover as defined in claim 16, wherein the step of acquiring the cryptographic key from the key depository is a result of a request from the second access point.

19. The method of performing authenticated handover as defined in claim 16, wherein acquiring the cryptographic key from the key depository is a result of the key depository independently distributing the cryptographic key.

20. The method of performing authenticated handover as defined in claim 16, further comprising:

generating a list of access point cryptographic values at the first access point, wherein one access point cryptographic value is generated for each neighbor access point of the first access point, and where each one of the access point cryptographic values is associated with one neighbor access point; and transmitting the list of access point cryptographic values and associated access point identifiers to the mobile station.

21. The method of performing authenticated handover as defined in claim 20 wherein generating the list of access point cryptographic values at the first access point also includes generating a cryptographic value that is not associated with a neighbor access point.

22. The method of performing authenticated handover as defined in claim 16, wherein receiving the reassociation request includes a station cryptographic value, the session key is generated using the station cryptographic value.

* * * * *